US007020547B2

(12) United States Patent
Ogaki

(10) Patent No.: US 7,020,547 B2
(45) Date of Patent: Mar. 28, 2006

(54) VEHICLE TRAVELING STATE RECORDING METHOD AND COMPUTER FOR ENGINE CONTROL

(75) Inventor: Koichi Ogaki, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 285 days.

(21) Appl. No.: 10/086,530

(22) Filed: Mar. 4, 2002

(65) Prior Publication Data

US 2002/0123834 A1 Sep. 5, 2002

(30) Foreign Application Priority Data

Mar. 5, 2001 (JP) ............................ 2001-060135

(51) Int. Cl.
*G01M 17/00* (2006.01)

(52) U.S. Cl. .......................... 701/35; 701/29; 701/115

(58) Field of Classification Search .................. 701/35, 701/29, 30, 31, 32, 114, 115, 102, 101
See application file for complete search history.

(56) References Cited

U.S. PATENT DOCUMENTS 4,462,079 A * 7/1984 Ito et al. ..................... 701/123
4,853,859 A * 8/1989 Morita et al. ................. 701/35
5,526,269 A * 6/1996 Ishibashi et al. .............. 701/35
5,737,711 A * 4/1998 Abe ............................ 701/29
6,301,533 B1 * 10/2001 Markow ...................... 701/35
6,393,347 B1 * 5/2002 Snyder et al. ................ 701/35
6,671,614 B1 * 12/2003 Weisman et al. ........... 701/115

FOREIGN PATENT DOCUMENTS

| | | |
|---|---|---|
| JP | U 6-51955 | 7/1994 |
| JP | A-07-296210 | 11/1995 |
| JP | A 8-110232 | 4/1996 |
| JP | A 10-19596 | 1/1998 |
| JP | A 10-283590 | 10/1998 |
| JP | A 11-281393 | 10/1999 |
| KR | 2001-0009244 | 2/2001 |

* cited by examiner

*Primary Examiner*—Richard M. Camby
(74) *Attorney, Agent, or Firm*—Oliff & Berridge, PLC

(57) ABSTRACT

Information indicating traveling states such as a traveling speed SPD is recorded in a computer for engine control. The recorded information can be read out using a self-diagnostic function after stopping of a vehicle. By a simple operation of grounding a certain terminal, it can also be displayed simply by blinking of a CE lamp. Since the record with high reliability remains, use can be made as materials on fair regulation.

9 Claims, 5 Drawing Sheets

FIG. 2

| | DATA 1 | 2 | 3 | 4 | 5 | ..... | a |
|---|---|---|---|---|---|---|---|
| SPD (km/h) | 5 | 10 | 43 | 82 | 125 | ..... | 75 |
| NE (r/min) | 700 | 750 | 700 | 1250 | 2010 | | 4230 |
| PM (kPa) | 23 | 25 | 24 | 35 | 82 | | 70 |
| TA (° ) | 23 | 23 | 23 | 23 | 43 | | 25 |
| TIME (SECONDS BEFORE) | NOW | 10 | 20 | 30 | 40 | ..... | 10 (a-1) |

(CASE OF b=105)

| | |
|---|---|
| MAX SPEED DATA (km/h) | 140 |

VEHICLE TRAVELING STATE RECORDING METHOD AND COMPUTER FOR ENGINE CONTROL

BACKGROUND OF THE INVENTION

1. Field of the Invention

The present invention relates to a vehicle traveling state recording method for recording information on traveling states including a traveling speed of an automobile, and also to a computer for engine control thereon.

2. Description of the Related Art

It has been proposed to monitor traveling states of a vehicle by a navigator which is mounted in an automobile and performs a route guide or drive support. JP-A-11-281393 discloses that a speed and road information are sequentially accumulated in an IC card as locus data and a driver is warned when an average speed exceeds the speed limit. JP-A-10-19596 discloses that traffic rule information corresponding to each road on a road map is stored in advance and notification is provided to prevent a violation when an operation state of an automobile is detected to predict a traffic rule violation. JP-A-8-110232 discloses that action histories of a mobile unit such as an automobile are recorded on a record medium capable of readout and writing and can be used for proving a traffic violation or a traffic offense later.

It is necessary to comply with the speed limit when an automobile is driven to travel a road. In case that a traveling speed exceeds the speed limit, it may become a target of speed regulation to be arrested as a speed violation. However, if traveling states are monitored by a navigator mounted in a vehicle and a warning is given in case of being in danger of a speed violation, a driver can avoid being arrested by committing the speed violation.

A speed violation in conventional traffic regulation is regulated by “photography by an installed camera”, a method for installing a speed gun commonly called “police trap”, or parallel running by “patrol car” or “police motorcycle”. In any case, the regulation can be performed only at “the limited place or time”. Because of this, the case of being caught by the traffic regulation often depends on luck, or a good driver who does not know information on camera installation is often caught by the traffic regulation. Even when the violation is monitored by a navigator and a warning of the speed violation is given, the regulation is not very performed actually, so that the warning tends to be ignored. On the other hand, once it has become a target of the regulation, even when a speed violation intends to be not committed, an objection cannot be made and the regulation must be accepted without satisfaction. Because of this, the violator tends not to feel deep regret for the speed violation and on the contrary, but to cause the speed violation while escaping the regulation.

JP-A-6-51955U discloses that a data collector is mounted in a vehicle and vehicle related data such as speed or the number of revolutions is recorded and a driver or a traffic regulator of police calls the recorded data and decision materials on whether a violation is caused or not is obtained. JP-A-10-283590 discloses that data communications are conducted between electronic signs installed along a road and a vehicle-mounted terminal device and a decision on a traffic violation is automatically made.

It is widely recognized that the speed limit is necessary for traffic safety and speed regulation is necessary to comply with the speed limit. However, in conventional speed regulation depending on luck in a snipe manner, a vicious driver tends to escape from the regulation and it is necessary to perform the regulation more fairly in a traveling state of the normal case.

Even when record of a traveling speed is kept in the navigator mounted in the vehicle or the data collector is mounted in the vehicle to record the traveling speed, use can be made only in the vehicle in which the device having such a function is mounted. Unless the electronic signs become widespread sufficiently, the idea using the electronic signs is also useful only in the limited places with respect to the vehicle in which the terminal device is mounted and the idea is difficult to become a fair regulation method.

SUMMARY OF THE INVENTION

An object of the invention is to provide a vehicle traveling state recording method capable of being used as materials on fair regulation in the normal case, and a computer for engine control.

According to the invention, there is provided a vehicle traveling state recording method wherein information about traveling states including a traveling speed of a vehicle is always recorded in a computer for engine control and after stopping of travel of the vehicle, the recorded information can be read out by a predetermined operation.

According to the invention, information about traveling states including a traveling speed of a vehicle is always recorded in a computer for engine control. The computer for engine control is mounted in most of the vehicle now for the purpose of efficiently operating an engine while improving fuel consumption under a condition compliant with exhaust gas control. The information about the traveling states including the traveling speed of the vehicle is also inputted to the computer for engine control as information for engine control. The information about the traveling states of the vehicle is always recorded and after stopping of travel of the vehicle, the recorded information can be read out by the predetermined operation, so that it can easily be decided whether a speed violation is caused or not when the recorded traveling speed is read out and is checked. The computer for engine control is difficult to change the recorded information by a driver of the vehicle and has high reliability of the recorded information and can be used as materials on speed regulation sufficiently. In the side of the police for performing traffic regulation, even when a speed gun is not installed, a runaway vehicle can be targeted for the regulation immediately and fair speed regulation can be implemented.

According to the invention, the information about the traveling states is recorded in predetermined cycles and after stopping of travel of the vehicle, at least the predetermined cycles of the information can be read out.

According to the invention, the record of the information about the traveling states can be ascended in time sequence on the basis of the time of stopping of the vehicle. For example, when a command to stop is given by a patrol car, it can be checked whether a speed violation is caused or not by making a stop immediately and reading out the information about the recorded traveling speed.

According to the invention, the record of the information about the traveling states can be read out by a tool for diagnosis adapted for the computer for engine control.

According to the invention, the computer for engine control is provided with functions of self diagnosis etc. and an analysis of abnormality or failure can be made using a tool for diagnosis which is provided in a service factory of an automobile and is adapted for the computer for engine control. Since the information about the traveling states is read out using such a tool, it can be decided whether a speed violation is caused or not by making effective use of the information about the traveling speed.

According to the invention, the predetermined operation is performed by changing a connection state of a predetermined terminal of the computer for engine control and by said operation, the recorded traveling speed is displayed in a blinking state of a lamp according to a preset code.

According to the invention, a driver of the vehicle or a police officer of speed regulation can easily check the information about the recorded traveling speed by changing a connection state of a predetermined terminal of the computer for engine control. The recorded traveling speed is displayed in a blinking state of a lamp according to a preset code. In the computer for engine control normally, a result of the self diagnosis is displayed by blinking a check engine warning lamp according to a preset diagnosis code. When the recorded information about the traveling speed is also displayed by blinking the lamp according to the code similarly, the existing devices can be used effectively.

According to the invention, the predetermined operation is performed by changing a connection state of a predetermined terminal of the computer for engine control and by said operation, the recorded traveling speed is displayed by a speed meter of the vehicle.

According to the invention, a driver of the vehicle or a police officer of speed regulation can easily check the information about the recorded traveling speed by changing a connection state of a predetermined terminal of the computer for engine control. Since the recorded information is displayed by a speed meter of the vehicle, the traveling speed can be checked easily.

According to the invention there is provided a navigator capable of retrieving the speed limit of a road during travel is mounted in the vehicle and records including the speed limit retrieved by the navigator are made as the information about the traveling states.

According to the invention, the vehicle records the speed limit of a road during travel in cooperation with a navigator, so that it can easily be checked whether or not the traveling speed exceeds the speed limit.

According to the invention, there is provided a computer for engine control which is mounted in a vehicle and performs control of an engine according to a preset program, characterized by comprising an input section for inputting information about traveling states including a traveling speed of the vehicle, memory capable of recording the information inputted to the input section, and a controller for performing control so that said information is sequentially recorded into the memory in predetermined cycles and the information recorded into the memory is outputted in response to a predetermined operation.

According to the invention, it is constructed so that an input section, memory and a controller are included in a computer for engine control which is mounted in a vehicle and performs control of an engine according to a preset program and thereby, information about traveling states including a traveling speed of the vehicle can be recorded and read out. The information is inputted to the input section and is sequentially recorded into the memory in predetermined cycles by the controller. The controller performing control so that the information recorded into the memory is outputted in response to a predetermined operation. The computer for engine control provides functions important for travel of the vehicle and the information recorded in the inside can be estimated that reliability is sufficiently high. The information about the traveling speed is also the information necessary for engine control and the information used for control can be recorded as it is. When the information about the recorded traveling speed is read out, it can easily be checked whether a speed violation is caused or not.

According to the invention, a vehicle speed signal inputted to a speed meter of the vehicle is inputted to the input section as information indicating the traveling speed, and there is further included a signal generator for generating the vehicle speed signal in a simulation manner to give the signal to the speed meter according to outputted information when information recorded into the memory is outputted by the controller.

According to the invention, the information about the recorded traveling speed can be displayed by a speed meter of the vehicle, so that the traveling speed can be checked simply.

BRIEF DESCRIPTION OF THE DRAWINGS

FIG. 2 is a graph showing a record state of information of FIG. 1.

DETAIELD DESCRIPTION OF THE PRESENT INVENTION

The present invention will be described in detail with reference to the accompanying drawings.

Figure 1:
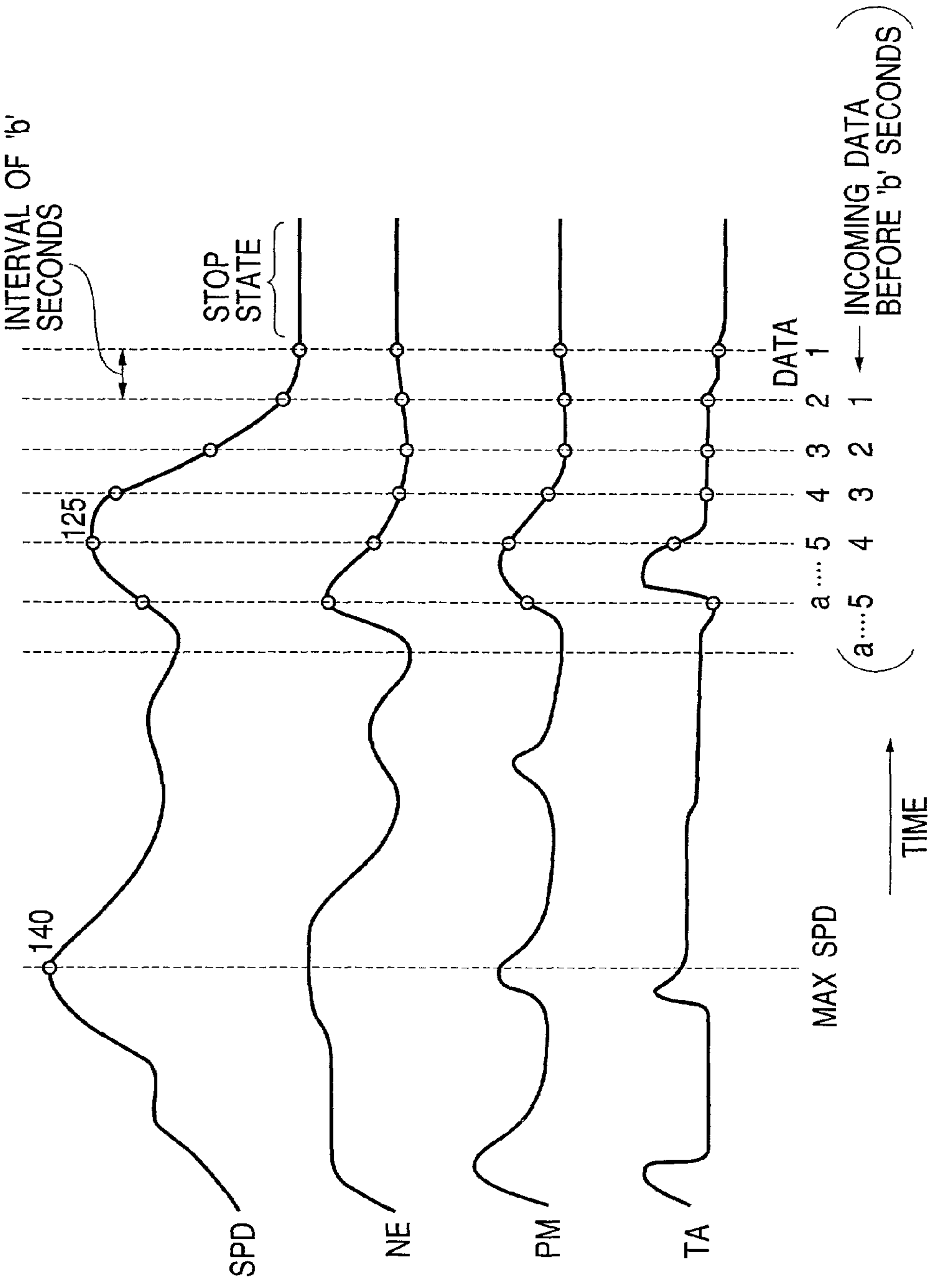
FIG. 1 is a time chart showing information recorded in one embodiment of the invention.

FIG. 1 shows four information always recorded in an EFI (Electronic Fuel Injection) which is one of an ECU (Electronic Control Unit) as information indicating traveling states in one embodiment of the invention. "SPD" indicates a traveling speed (km/h) corresponding to vehicle speed pulses. "NE" indicates the number of revolutions (r/min) of an engine. "PM" indicates a intake manifold pressure (kPa). "TA" indicates an opening angle (°) of a throttle valve.

Each the information can be recorded by pieces "a" at intervals of "b" seconds. After recording "a" pieces of information, the oldest information at that point in time is replaced with the newest information and is updated. Since the recording is stopped when a vehicle stops, the newest information to b×(a−1) seconds before the stop is always recorded by a pieces at intervals of b seconds.

FIG. 2 shows numeric values corresponding to the information recorded in FIG. 1. It is found that a traveling speed SPD has become 125 km/h in the fifth data on the basis of a point in time of the stop. In the case of b=10 s, the fact that the vehicle has traveled at a traveling speed of 125 km/h before 40 seconds of the vehicle stop remains as the record. It is found that a value of a throttle valve opening angle TA has also become 43° at this time as shown by slash marks and the mind of stepping on an accelerator pedal to accelerate has existed.

Also, record at the travel before b×(a−1) seconds is left as the maximum speed MAX SPEED DATA. In this case, the maximum speed of 140 km/h is recorded. When new information is inputted, information about a traveling speed is compared with the maximum speed and when the information about the traveling speed higher than the maximum speed is inputted, the maximum speed is updated. When the maximum speed is higher than the inputted information, the information about the maximum speed is maintained as it is.

Figure 3:
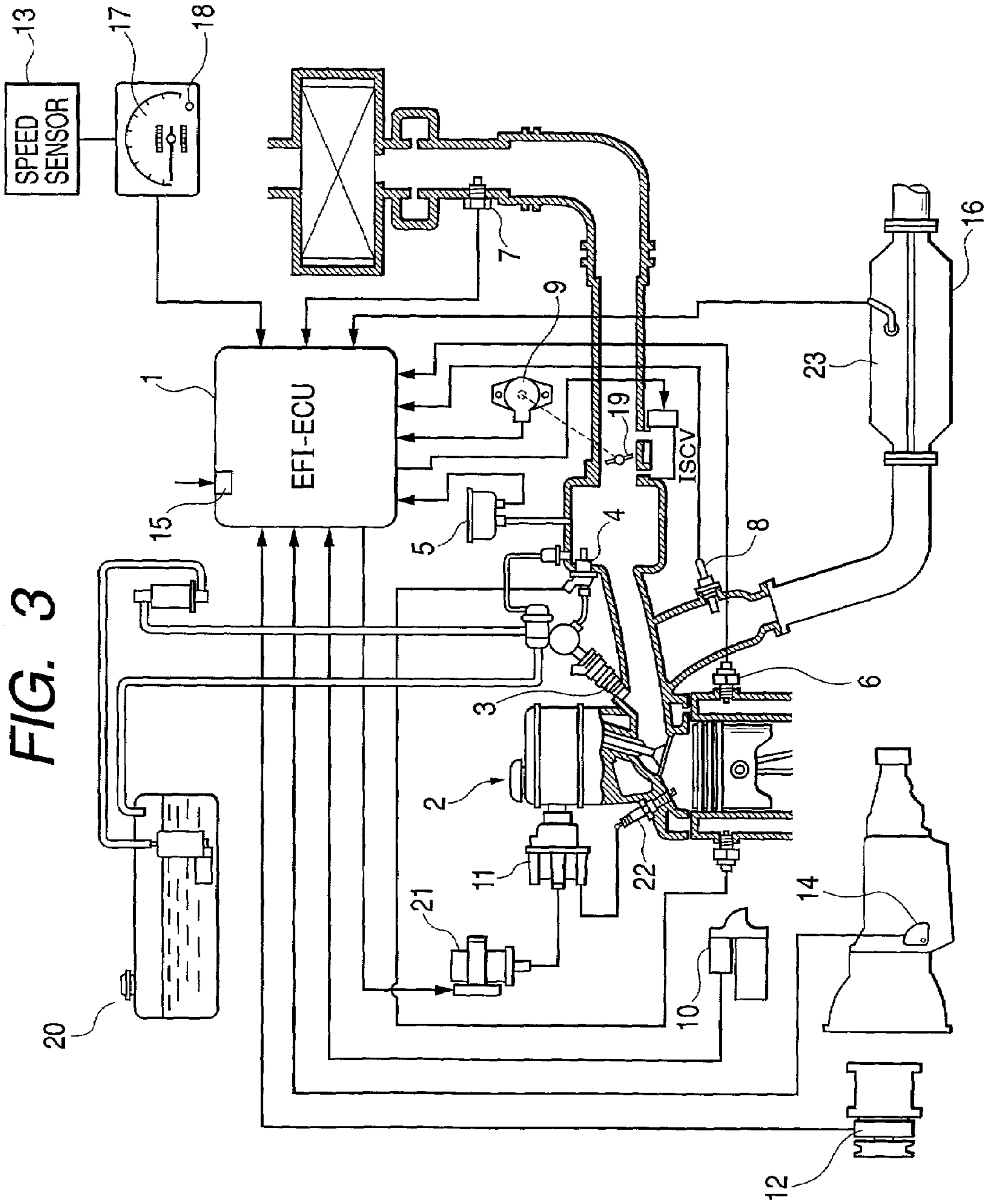
FIG. 3 is a block diagram showing a schematic system configuration including an EFI-ECU 1 used in the embodiment of FIG. 1.

FIG. 3 shows the whole system configuration including an EFI-ECU 1 used in the embodiment. The EFI-ECU 1 is one of a computer for engine control for controlling an engine 2 of a vehicle and performs control of a fuel injection quantity from an injector 3. A cold start injector 4 used at the time of engine starting is also provided in the engine 2 and is controlled by the EFI-ECU 1. Input data for control of the injector 3 is inputted from a vacuum sensor 5, a water temperature sensor 6, an intake temperature sensor 7, an $O_2$ sensor 8, a throttle position sensor 9, a starter 10, a distributor 11, an air conditioner switch 12, a vehicle speed sensor 13, a neutral start switch 14, an input terminal 15 for test and an exhaust temperature sensor 16.

The traveling speed SPD shown in FIG. 1 is inputted from the vehicle speed sensor 13 for giving vehicle speed pulses for speed indication to a speed meter 17. The speed sensor 13 is provided in the vicinity of a wheel actually and detects revolutions of the wheel. A check engine warning lamp (hereinafter abbreviated as "CE lamp") 18 is also provided in the vicinity of the speed meter 17. The number NE of revolutions of the engine is calculated based on a crank angle signal from a crank angle provided in the distributor 11. The intake manifold pressure PM is inputted from the vacuum sensor 5. The throttle opening angle TA is inputted from the throttle position sensor 9 for detecting an opening angle of a throttle valve 19.

The EFI-ECU 1 shown in FIG. 3 controls a fuel injection quantity to the engine 2 of fuel supplied from a fuel tank 20 to the injector 3. Also, the EFI-ECU 1 gives an ignition signal to an ignition coil of an igniter 21 and performs control for igniting a sparkplug 22 through the distributor 11. One object of control is that a temperature of the exhaust temperature sensor 16 for detecting a temperature of a catalytic device 23 for cleaning exhaust gas of the engine 2 is intended to be within a proper range.

Figure 4:
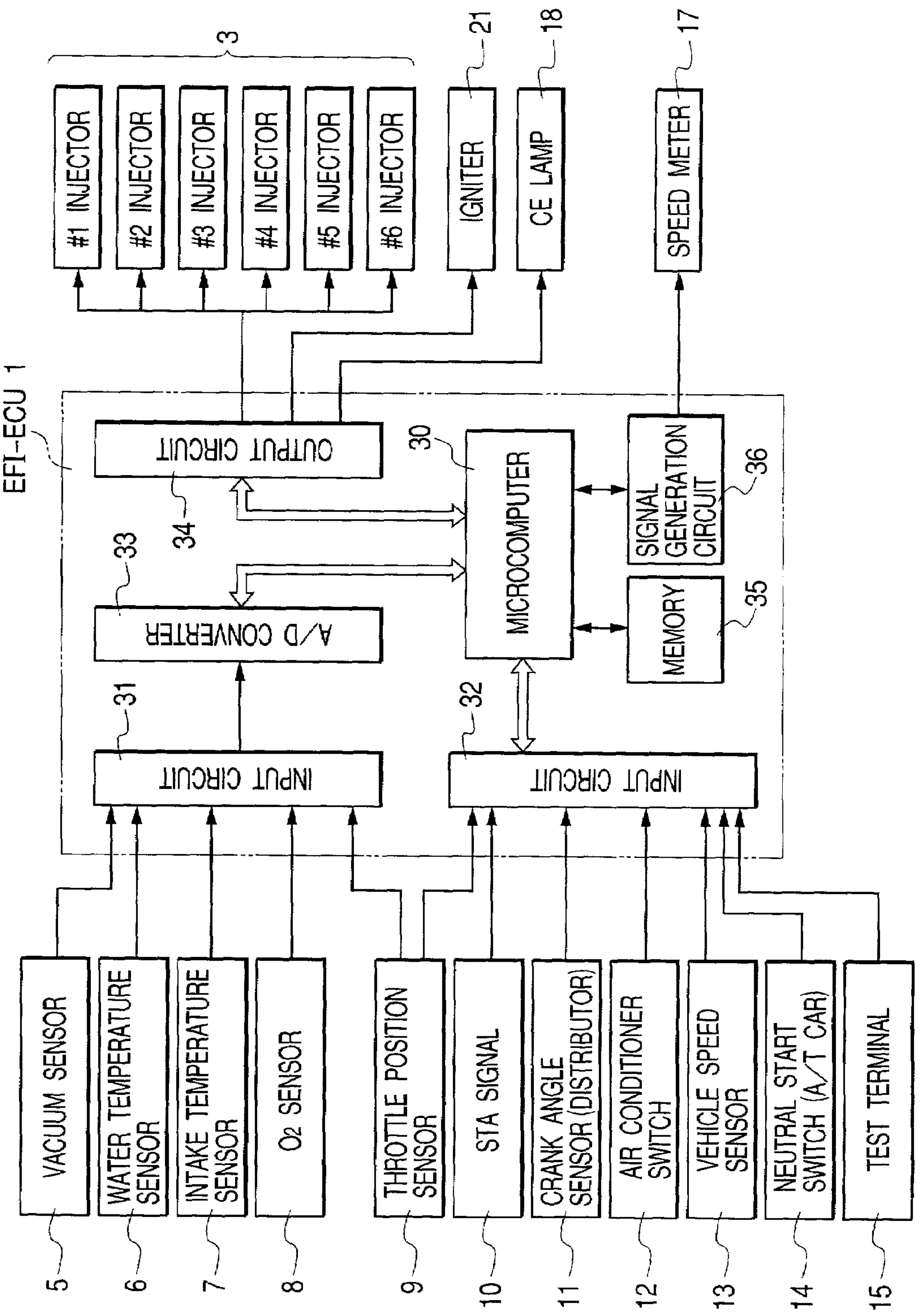
FIG. 4 is a block diagram showing a schematic electrical configuration of the EFI-ECU 1 of FIG. 3.

FIG. 4 shows a schematic electrical configuration of the EFI-ECU shown in FIG. 3. The whole control of the EFI-ECU 1 is performed by a microcomputer 30. The microcomputer 30 which is a controller performs control capable of recording and reading out information about traveling states as well as control acting as the EFI-ECU 1 according to a preset program. Input from each the sensor is done to the microcomputer 30 through input circuits 31, 32. But, a signal from the vacuum sensor 5 is converted from an analog signal to a digital signal by an A/D converter 33 and is inputted to the microcomputer 30. The microcomputer 30 outputs a signal for operation to the injector 3 or the igniter 21 through an output circuit 34. The injector 3 is present by the number of cylinders of the engine and controls in timing respectively.

The EFI-ECU of the embodiment is provided with memory 35 and a signal generation circuit 36. Information indicating the traveling states of the vehicle as shown in FIG. 2 can be recorded in the memory 35. The signal generation circuit 36 generates a signal for indicating the traveling speed SPD recorded in the memory 35 by the speed meter 17.

The EFI-ECU 1 shown in FIG. 4 is standard as a vehicle-mounted ECU and is set so as to read out the information recorded in the memory 35 using a diagnosis communication checker such as a trade name of "S2000 Bestronics Checker" used on the market at present. The diagnosis communication checker is connected to a connection terminal omitted in the drawing. A communication function of such a case is based on KWP2000 and ISO9141-2.

Figure 5:
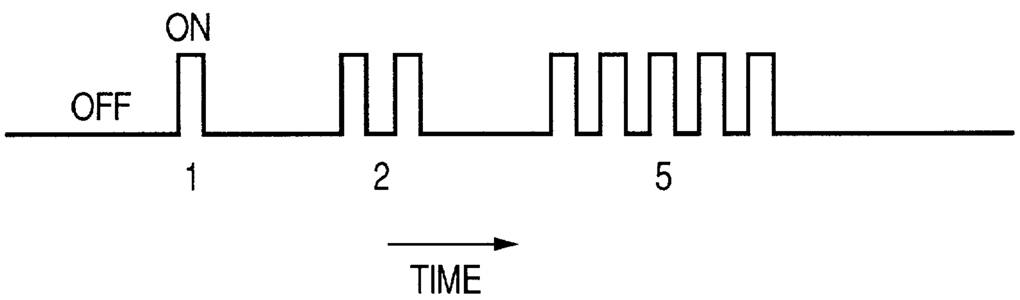
FIG. 5 is a time chart showing a state of displaying recorded information in the EFI-ECU 1 of FIG. 4.

FIG. 5 shows an example of displaying the recorded information by blinking the CE lamp 18 in the EFI-ECU 1 of the embodiment. The EFI-ECU 1 provides the test input terminal 15 and, for example, when this is short-circuited to a ground potential GND, the recorded contents can be displayed by the CE lamp 18 according to a 3-digit code. Since a diagnosis code by a self-diagnostic function acting as the EFI-ECU 1 is two digits, a 3-digit code is used for distinction. FIG. 5 indicates the case of 125 km/h.

Figure 6:
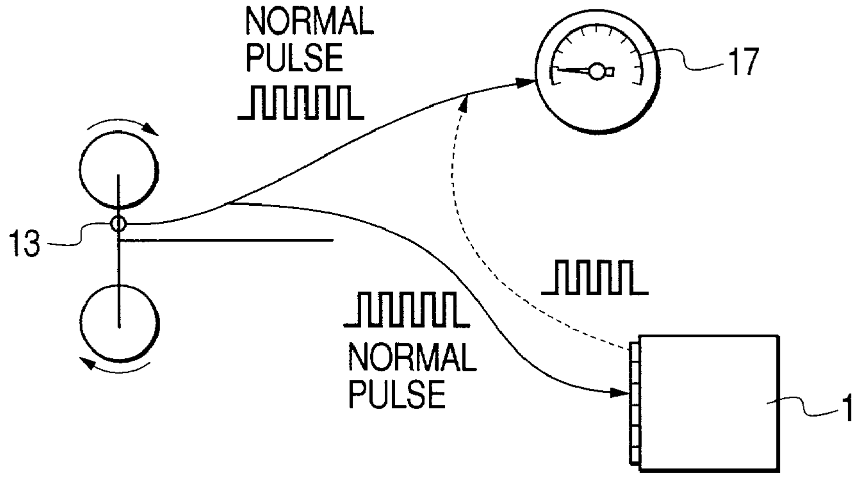
FIG. 6 is a simplified block diagram showing a state of displaying speed in the EFI-ECU 1 of FIG. 4.

FIG. 6 shows a state of displaying the traveling speed SPD recorded in the speed meter 17 by the signal generation circuit 36. The speed meter 17 displays a vehicle speed using vehicle speed pulses from the vehicle speed sensor 13 provided in an axle as a vehicle speed signal. The vehicle speed pulses are recorded in the EFI-ECU 1 and when information is read out, artificial vehicle speed pulses are generated corresponding to information about the traveling speed SPD and are displayed by the speed meter 17.

The EFI-ECU 1 of the embodiment can easily make a decision on whether or not there is a speed violation in cooperation with a navigator when the navigator detects a legal speed which is the speed limit of a road during travel and records the detected legal speed in parallel with the memory 35. Also, in the case of "traveling speed">"legal speed+$\alpha$", independent regulation can be performed beforehand so as not to cause a serious speed violation when it is constructed so as to give a warning independently. As means of the warning, for example, it may be constructed so that the chimes sounding at a speed of 100 km/h conventionally are sounded at the time of exceeding the legal speed.

In the embodiment, data can go back before several seconds or several minutes to be monitored while the present vehicle data has only been monitored conventionally. The numeric value of a or b described above can be set freely and go back to the past in detail as necessary to be monitored.

Also, there is no need to make a tool newly in order to read out the record, and information about traveling states can be monitored by using the existing tool and reading out the record. Even when the tool is not carried, the monitoring can simply be performed by a simple operation to a test terminal.

When the legal speed is recorded in parallel in cooperation with the navigator, violation states can be checked by going back to the time when regulation of the police does not extend. Also, an effect of suppressing a speed violation can be expected by independently giving a warning of an excess of speed. The warning chimes of speed can also be sounded more effectively.

Incidentally, in the description, information about the traveling speed etc. is recorded in the EFI-ECU 1, but a computer for engine control for performing another control can similarly be constructed so as to always record information about the traveling states and read out the information later.

As described above, according to the invention, information about traveling states including a traveling speed of a vehicle is always recorded in a computer for engine control mounted in most of the vehicle now and after stopping of travel of the vehicle, the recorded information can be read out and checked by the predetermined operation. It can easily be decided whether a speed violation is caused or not when the recorded traveling speed is read out and is checked. The information recorded in the computer for engine control has high reliability and can be used as materials on speed regulation sufficiently and fair speed regulation can be implemented.

According to the invention, the record of the information about the traveling states can be ascended in time sequence on the basis of the time of stopping of the vehicle and it can be checked whether a speed violation is caused or not.

According to the invention, the information about the traveling states is read out using a tool prepared for the computer for engine control, so that the information about the traveling speed can be used effectively.

According to the invention, the information about the recorded traveling speed can easily be checked by changing a connection state of a predetermined terminal of the computer for engine control. The recorded traveling speed is displayed in a blinking state of a lamp according to a preset code, so that the existing devices providing functions of self diagnosis etc. can be used effectively.

According to the invention, the information about the recorded traveling speed can easily be checked by changing a connection state of a predetermined terminal of the computer for engine control. The recorded traveling speed is displayed by a speed meter of the vehicle, so that the traveling speed can be checked easily.

According to the invention, in cooperation with a navigator, it can easily be checked whether or not the traveling speed of the vehicle exceeds the speed limit of a road during travel.

According to the invention, the information about the traveling states including the traveling speed necessary for engine control is recorded by the computer for engine control in which functions important for travel of the vehicle are provided and the information recorded in the inside can be estimated that reliability is sufficiently high. The information used for control can be recorded as it is. When the information about the recorded traveling speed is read out, it can easily be checked whether a speed violation is caused or not.

According to the invention, the recorded traveling speed can be displayed using a speed meter of the vehicle, so that the traveling speed can be checked easily.

What is claimed is:

1. A vehicle traveling state recording method comprising:

recording information on traveling states, the information including traveling speeds of a vehicle, in a memory built in a computer, the computer controlling an engine and an amount of fuel supply;

stopping the recording of the information on the traveling states when the vehicle stops;

reading the recorded information out from the memory;

outputting the read-out information from an output terminal:

changing a connection state of a predetermined terminal of the computer for engine control to perform a predetermined operation; and displaying the recorded traveling speed on a speed meter of the vehicle.

2. The vehicle traveling state recording method as defined in claim 1, wherein the recorded information is read after stopping the vehicle.

3. The vehicle traveling state recording method as defined in claim 1, wherein the information on the traveling states is recorded in predetermined cycles; and at least the predetermined cycles of the information is read out after stopping of travel of the vehicle.

4. The vehicle traveling state recording method as defined in claim 1, wherein the recorded information on the traveling states is read out by a tool for diagnosis adapted for the computer for engine control.

5. A vehicle traveling state recording method comprising:

recording information on traveling states, the information including traveling speeds of a vehicle, in a memory built in a computer, the computer controlling an engine and an amount of fuel supply;

stopping the recording of the information on the traveling states when the vehicle stops;

reading the recorded information out from the memory;

outputting the read-out information from an output terminal;

changing a connection state of a predetermined terminal of the computer for engine control to perform a predetermined operation; and displaying the recorded traveling speed displayed in a blinking state of a lamp according to a preset code.

6. A vehicle traveling state recording method comprising:

recording information on traveling states, the information including traveling speeds of a vehicle, in a memory built in a computer, the computer controlling an engine and an amount of fuel supply;

stopping the recording of the information on the traveling states when the vehicle stops;

reading the recorded information out from the memory;

outputting the read-out information from an output terminal mounting a navigator for retrieving a speed limit of a road during travel in the vehicle; and recording the information together with the speed limit retrieved by the navigator.

7. The vehicle traveling state recording method as defined in claim 1, wherein the information on the traveling states further includes:

a number of revolutions of an engine;

a intake manifold pressure; and an opening angle of a throttle.

8. A vehicle traveling state recording method comprising the steps of:

recording information on traveling states including a traveling speed of a vehicle in a computer for engine control when the vehicle is running;

reading the recorded information out by a predetermined operation;

changing a connection state of a predetermined terminal of the computer for engine control to perform the predetermined operation; and displaying the recorded traveling speed displayed in a blinking state of a lamp according to a preset code.

9. A vehicle traveling state recording method comprising the steps of:

recording information on traveling states including a traveling speed of a vehicle in a computer for engine control when the vehicle is running;

reading the recorded information out by a predetermined operation;

mounting a navigator for retrieving a speed limit of a road during travel in the vehicle; and recording the information together with the speed limit retrieved by the navigator.

* * * * *